United States Patent
Liao et al.

(10) Patent No.: US 8,390,210 B2
(45) Date of Patent: Mar. 5, 2013

(54) LIGHT DRIVER CIRCUIT DEVICE AND BACKLIGHT DEVICE

(75) Inventors: Cheng-Neng Liao, Hsinchu (TW); Chia-Hung Sun, Hsinchu (TW); Huang-Ti Lin, Hsinchu (TW); Chin-Chuang Chueh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/211,343

(22) Filed: Aug. 17, 2011

(65) Prior Publication Data
US 2011/0298388 A1 Dec. 8, 2011

Related U.S. Application Data

(62) Division of application No. 12/166,317, filed on Jul. 1, 2008, now Pat. No. 8,030,852.

(30) Foreign Application Priority Data

Feb. 14, 2008 (TW) .............................. 97105177 A (51) Int. Cl.
*H05B 41/16* (2006.01)
*H05B 39/00* (2006.01)
(52) U.S. Cl. ........................................ 315/276; 315/282
(58) Field of Classification Search .................. 315/276, 315/277, 280, 279, 282, 283, 224, 291, 307, 315/315, DIG. 4, DIG. 3
See application file for complete search history.

(56) References Cited

U.S. PATENT DOCUMENTS

| | | | | |
|---|---|---|---|---|
| 6,420,839 B1 * | 7/2002 | Chiang et al. | ................. | 315/311 |
| 6,534,934 B1 * | 3/2003 | Lin et al. | ........................ | 315/312 |
| 7,095,180 B2 * | 8/2006 | Emslie et al. | ................. | 315/161 |
| 7,443,112 B2 * | 10/2008 | Wey et al. | ..................... | 315/291 |
| 7,633,240 B2 * | 12/2009 | Kwon | ........................... | 315/282 |
| 7,667,411 B2 * | 2/2010 | Kim et al. | ..................... | 315/282 |
| 7,777,425 B2 * | 8/2010 | Hsu et al. | ..................... | 315/282 |
| 7,800,318 B2 * | 9/2010 | Hsu | ............................... | 315/308 |

* cited by examiner

*Primary Examiner* — Minh D A
(74) *Attorney, Agent, or Firm* — Jianq Chyun IP Office (57) ABSTRACT

A light driver circuit device for synchronously driving a plurality of cold cathode fluorescent lamps (CCFLs) is provided. The light driver circuit device includes an inverter circuit board and a balance circuit board. The inverter circuit board has an inverter circuit coupled to a driving signal for outputting a driving voltage to drive the CCFLs synchronously. The balance circuit board and the inverter circuit board are installed separately, and the balance circuit board has a balance circuit coupled to a terminal of each CCFL and the inverter circuit. The CCFL driving architecture is designed to install the inverter circuit and the balance circuit individually, thus effectively reducing the space of the driving circuit and the total cost of the circuit design. Furthermore, the balance circuit board can balance the current in each CCFL effectively, and there is no limitation to where the balance circuit board can be disposed.

11 Claims, 8 Drawing Sheets

LIGHT DRIVER CIRCUIT DEVICE AND BACKLIGHT DEVICE

CROSS-REFERENCE TO RELATED APPLICATION

This application is a divisional of and claims the priority benefit of U.S. application Ser. No. 12/166,317, filed on Jul. 1, 2008, now allowed and issued as U.S. Pat. No. 8,030,852, which claims the priority benefit of Taiwan application serial no. 97105177, filed on Feb. 14, 2008. The entirety of each of the above-mentioned patent applications is hereby incorporated by reference herein and made a part of this specification.

BACKGROUND OF THE INVENTION

1. Field of the Invention

The present invention generally relates to a circuit device, and in particular, to a circuit device for driving a light source.

2. Description of Related Art

Liquid crystal displays (LCDs) have gradually become a mainstream display among others. LCD panels are actually electronic controlled light valves and produce visible images by the use of light driver circuit devices. LCDs generally use cold cathode fluorescent lamps ("lamps" for short hereinafter) to provide light sources. Other light driver circuits, such as light emitting diodes (LEDs), also attract some attention, but the applications of them are limited due to the high costs. Since the LCDs are consumer products, besides performances, an overriding factor in design is the cost. Therefore, one of the most important targets in design of the LCD light driver circuits is to reduce the cost.

Figure 1:
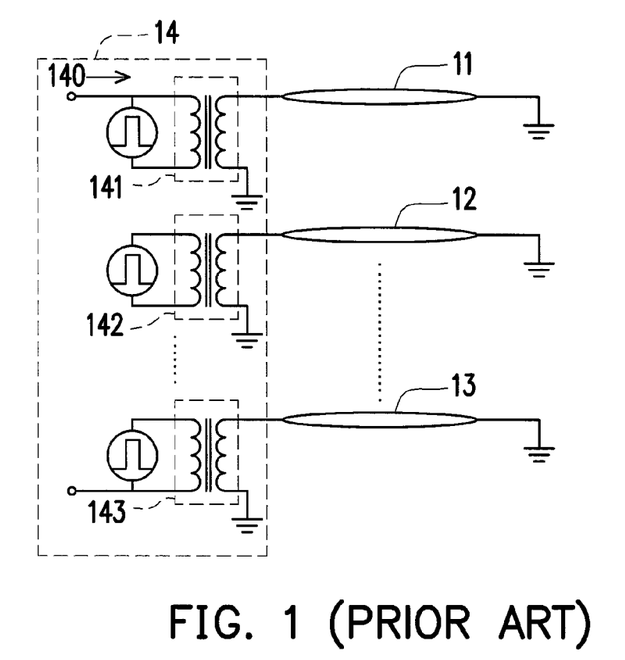
FIG. 1 is a circuit block diagram of a conventional light driver circuit device for driving a plurality of lamps in a single side drive mode.

FIG. 1 shows a conventional light driver circuit device and a lamp assembly. Referring to FIG. 1, an inverter circuit 14 is coupled to a plurality of lamps 11, 12, ..., 13, for example. Generally speaking, the inverter circuit 14 may convert a DC power source 140 into an AC power source required by the lamps 11, 12, ..., 13.

For the current applications of medium or small-sized light driver circuits, the liquid crystal screen of a notebook or a desktop computer requires one to four lamp assemblies, and thus the number of the inverter circuits must be one to four sets. Since a large-sized light driver circuit requires more lamps, the inverter circuit uses several sets of transformers 141, 142, ..., 143 to drive the lamps 11, 12, ..., 13 in a single side drive mode in FIG. 1. However, with the application of the light driver circuit, the size of the LCD is made to be larger. Therefore, in order to overcome the non-uniform luminance distribution of the light driver circuit device due to the leakage current, a double side drive mode has been provided in the prior art.

Figure 2:
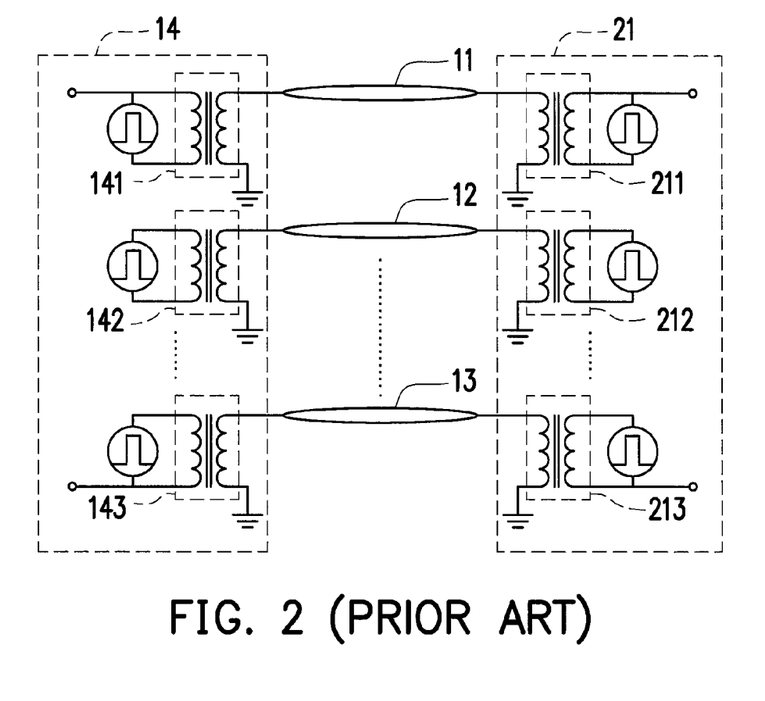
FIG. 2 is a circuit block diagram of a conventional light driver circuit device for driving a plurality of lamps in a double side drive mode.

FIG. 2 shows a conventional light driver circuit device in the double side drive mode and a lamp assembly. Referring to FIG. 2, the light driver circuit device is installed with two sets of inverter circuits 14, 21, each having a plural sets of transformers 141, 142, ..., 143 and 211, 212, ..., 213 respectively coupled to both terminals of the lamps 11, 12, ..., 13. Although the double side drive mode may reduce the leakage current, the number of the elements required by the inverter also increases, thus increasing the cost of a printed circuit board (PCB). If the number of the elements can be reduced, the cost will be relatively lowered, thereby achieving the current main purpose of the backlight design technique.

SUMMARY OF THE INVENTION

Accordingly, the present invention is directed to a light driver circuit device, which effectively reduces the space of the circuit and the total cost of the circuit design.

The present invention is further directed to a backlight device. The balance circuit board can be disposed freely, thus reducing the space of the circuit board.

The present invention provides a light driver circuit device for synchronically driving a plurality of CCFLs. The light driver circuit device includes an inverter circuit board and a balance circuit board. The inverter circuit board has an inverter circuit coupled to a driving signal for outputting a driving voltage to drive the lamps synchronously. The balance circuit board and the inverter circuit board are installed separately, and the balance circuit board has a balance circuit coupled to a terminal of the CCFLs and the inverter circuit.

In another aspect, the present invention provides a backlight device, which includes a substrate, a lamp, a lamp holder, an inverter module, and a balance circuit board. The lamp holder is disposed on one side of the substrate, for fixing the lamp. The lamp is disposed on one side of the substrate and inside the lamp holder, or the lamp is disposed outside the lamp holder, and even on the other side of the substrate. The inverter module provides at least a driving voltage to drive the lamp. The balance circuit board has one circuit element coupled to the lamp. In addition, the backlight device also includes a reflector and a diffuser in parallel to the reflector. The reflector is disposed on a bottom of the lamp holder, for reflecting lights emitted by the lamp. The diffuser is disposed on a top of the lamp holder, for diffusing lights emitted by the lamp to form a surface light source.

In the present invention, the light driver circuit device is designed to install the inverter circuit and the balance circuit individually, so as to effectively reduce the space of the driving circuit and the total cost of the circuit design. Moreover, the balance circuit board is employed in the present invention, thus balancing the current in each CCFL effectively, and there is no limitation where the balance circuit board can be disposed.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 3:
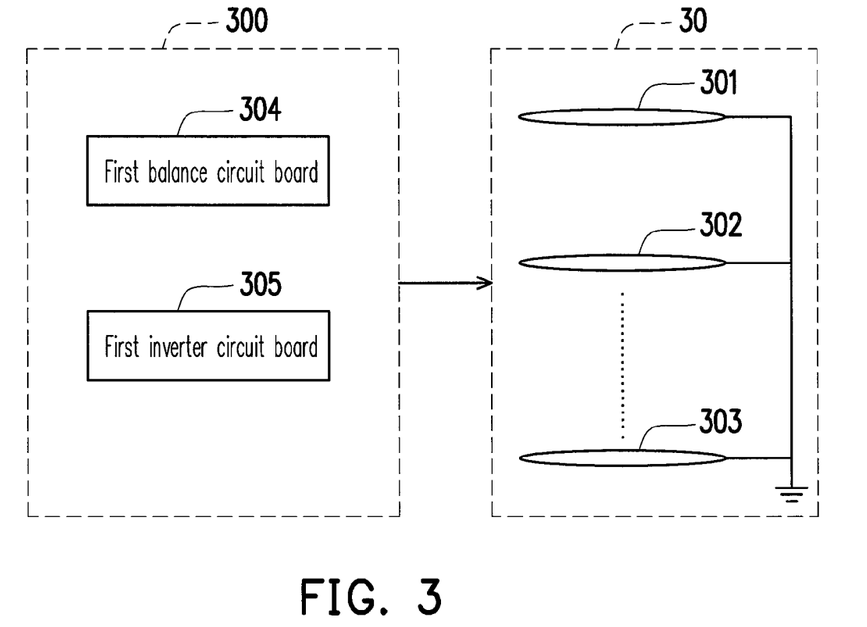
FIG. 3 is a circuit block diagram of a light driver circuit device according to an embodiment of the present invention.

FIG. 3 is a circuit block diagram of a light driver circuit device according to an embodiment of the present invention. Referring to FIG. 3, the light driver circuit device 300 is used to drive a plurality of lamps 301, 302, . . . , 303 in a lamp assembly 30. The light driver circuit device 300 includes a first balance circuit board 304 and a first inverter circuit board 305. In particular, the first inverter circuit board 305 and the first balance circuit board 304 are installed separately. In this embodiment, the first inverter circuit board 305 has an inverter circuit for outputting a driving voltage to drive the lamps 301, 302, . . . , 303. In addition, the first balance circuit board 304 also has a balance circuit for uniformly distributing the driving voltage to the lamps 301, 302, . . . , 303.

In some embodiments, the balance circuit of the balance circuit board 304 may include a capacitor, an inductor, a switch, or a resistor. Several embodiments will be given below to illustrate the structure of the light driver circuit device 300.

First Embodiment

Figure 4A:
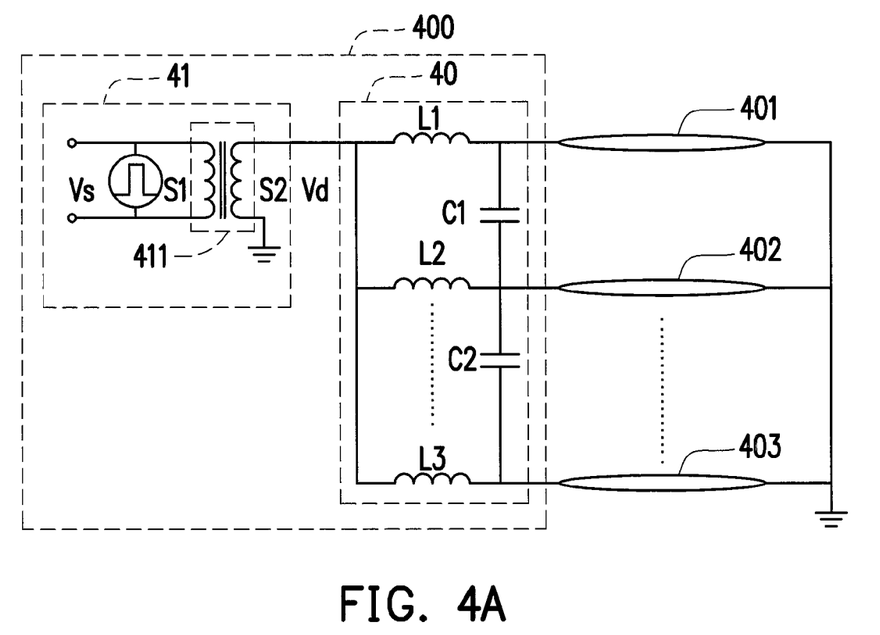
FIG. 4A is a circuit block diagram of a first embodiment of the light driver device in FIG. 3.

FIG. 4A is a circuit block diagram of a first embodiment of the light driver device 300 in FIG. 3. Referring to FIG. 4A, the light driver device 400 includes a first inverter circuit board 41 and a first balance circuit board 40. The first inverter circuit board 41 has an inverter circuit coupled to a balance circuit on the first balance circuit board 40, and the balance circuit is coupled to lamps 401, 402, . . . , 403.

The inverter circuit on the first inverter circuit board 41 has a first transformer 411 with a primary side S1 for receiving a driving signal Vs. In addition, a secondary side S2 of the first transformer 411 has one end grounded and the other end coupled to the first balance circuit board 40. Thus, the secondary side of the first transformer 411 may sense the driving signal Vs received by the primary side of the first transformer 411, and output a driving signal Vd.

Further, the balance circuit on the first balance circuit board 40 includes several inductors L1, L2, . . . , L3, and several capacitors C1, . . . , C2. One ends of the inductors L1, L2, . . . , L3 are coupled to the secondary side S2 of the first transformer 411, and the other ends of the inductors L1, L2, . . . , L3 are respectively coupled to high-voltage sides of the corresponding lamps 401, 402, . . . , 403. Further, the capacitors C1, . . . , C2 connect the high-voltage terminals of adjacent lamps, namely, the capacitors C1 is coupled between the high-voltage terminals of adjacent lamps 401 and 402, and the capacitors C2 is coupled between the high-voltage terminals of adjacent lamps 402 and 403. In this embodiment, low-voltage sides of the lamps 401, 402, . . . , 403 are commonly grounded.

Figure 4B:
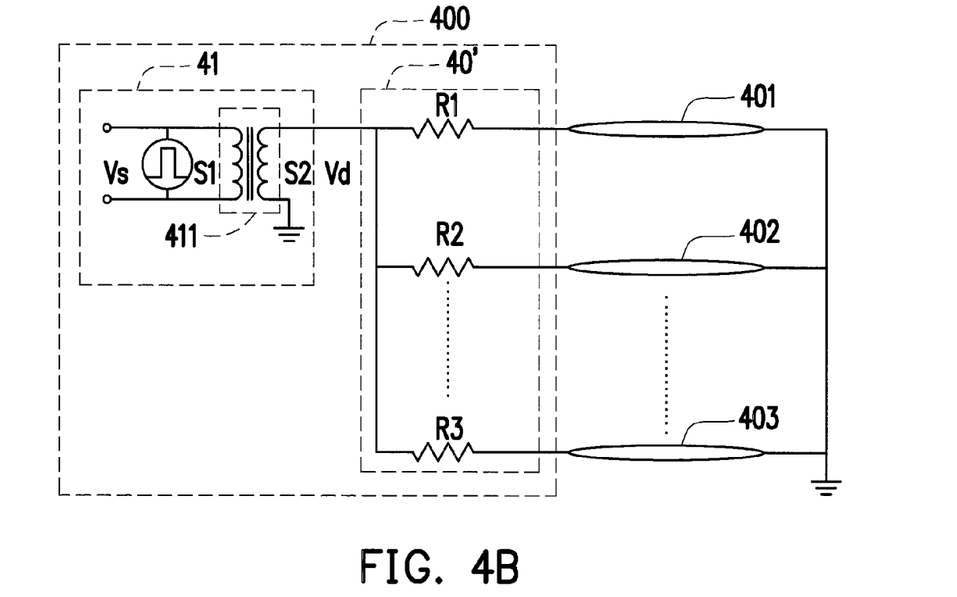
FIGS. 4B and 4C are respectively a modification embodiment of the first embodiment shown in FIG. 4A.
Figure 4C:
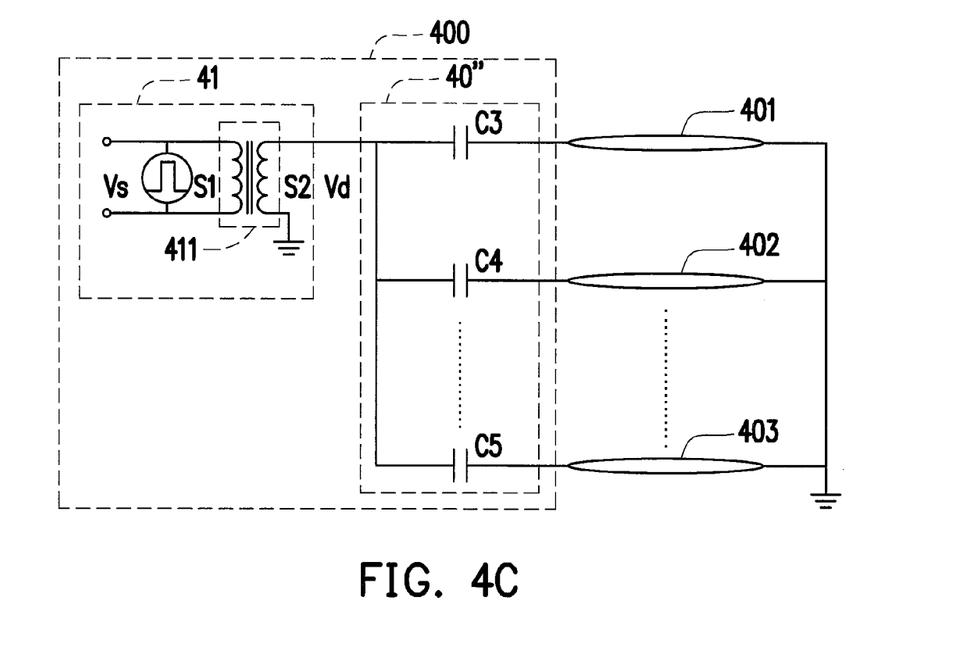

When the primary side of the first transformer 411 receives the driving signal Vs, the secondary side of the first transformer 411 may sense the driving signal Vs and outputs the driving voltage Vd to the first balance circuit board 40. At this time, the inductors L1, L2, . . . , L3 and capacitors C1, . . . , C2 on the first balance circuit board 40 receive and uniformly distribute the driving voltage Vd provided by the first transformer 411 to the lamps 401, 402, . . . , 403, so as to respectively drive the lamps 401, 402, . . . , 403 to emit light. In the other hands, FIGS. 4B and 4C are respectively a modification embodiment of the first embodiment shown in FIG. 4A. Referring to FIGS. 4A-4C, the first balance circuit board 40 shown in FIG. 4A can be replaced by the first balance circuit board 40' shown in FIG. 4B, wherein the first balance circuit board 40' includes several resistors R1, R2, . . . , R3 with one ends coupled to the secondary side of the first transformer 411 and the other ends respectively coupled to the high-voltage terminals of the lamps 401, 402, . . . 403. Alternately, the first balance circuit board 40 shown in FIG. 4A can be replaced by the first balance circuit board 40" shown in FIG. 4C, wherein the first balance circuit board 40" includes several capacitors C3, C4, . . . , C5 with one ends coupled to the secondary side of the first transformer 411 and the other ends respectively coupled to the high-voltage terminals of the lamps 401, 402, . . . 403.

Second Embodiment

Figure 5A:
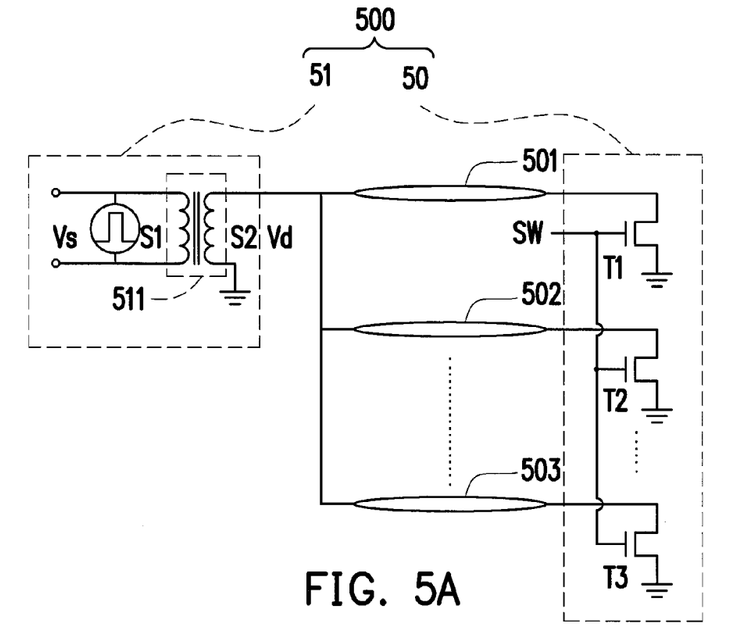
FIG. 5A is a circuit block diagram of a second embodiment of the light driver device in FIG. 3.

FIG. 5A is a circuit block diagram of a second embodiment of the light driver device 300 in FIG. 3. Referring to FIG. 5A, the light driver device 500 also includes a first inverter circuit board 51 and a first balance circuit board 50. The first inverter circuit board 51 has an inverter circuit with a first transformer 511. The first transformer 511 further has a primary side S1 and a secondary side S2. Similarly, the primary side S1 of the first transformer 511 receives a driving signal Vs, and the secondary side S2 of the first transformer 511 has one end grounded and the other end of the first transformer 511 is coupled to high-voltage terminals of lamps 501, 502, . . . , 503. The operating mode of the inverter circuit has been illustrated in the above embodiment, and will not be described herein again.

Figure 5B:
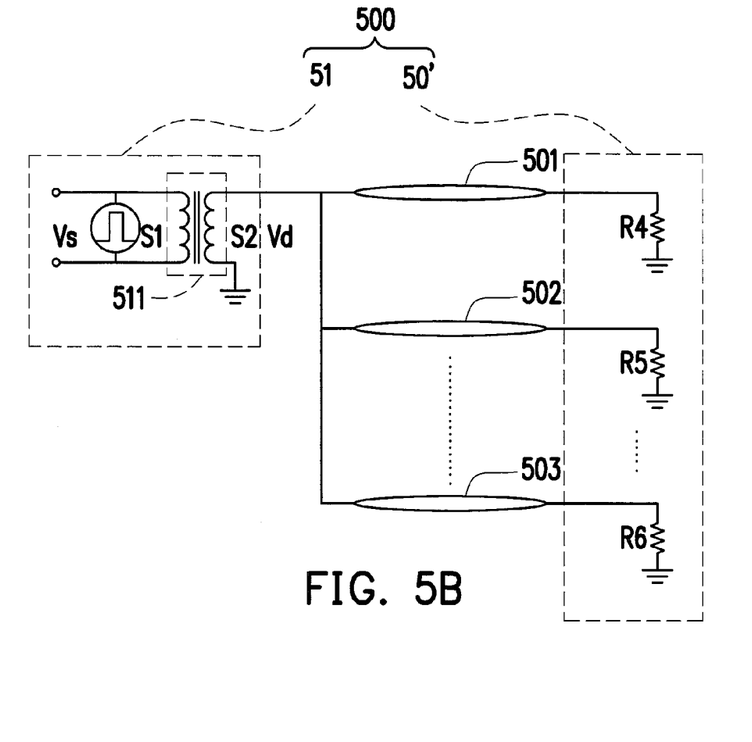
FIG. 5B is a modification embodiment of the second embodiment shown in FIG. 5A.

In this embodiment, the balance circuit on the first balance circuit board 50 includes a plurality of switches, for example, T1, T2, . . . , T3. The switches T1, T2, . . . , T3 are respectively coupled to low-voltage terminals of the lamps 501, 502, . . . , 503. In this embodiment, the switches T1, T2, . . . , T3 may be realized by transistors. Each switch transistor has a first source/drain end coupled to a low-voltage terminal of the corresponding lamp, a second source/drain end grounded, and a gate end coupled to a switching signal SW. Thus, when the switching signal SW is enabled, each of the switches T1, T2, . . . , T3 may ground the low-voltage terminals of the corresponding lamp 501, 502, . . . , 503. At this time, the balance circuit board 40 distributes the driving voltage to each of the lamps 501, 502, . . . , 503, so as to drive the lamps 501, 502, . . . , 503 to emit light. In the other hands, FIG. 5B is a modification embodiment of the second embodiment shown in FIG. 5A. Referring to FIGS. 5A and 5B, the first balance circuit board 50 shown in FIG. 5A can be replaced by the first balance circuit board 50' shown in FIG. 5B, wherein the first balance circuit board 50' includes several resistors R4, R5, . . . , R6 with one ends coupled to the low-voltage terminals of the lamps 501, 502, . . . , 503 and the other ends grounded.

Third Embodiment

Figure 6:
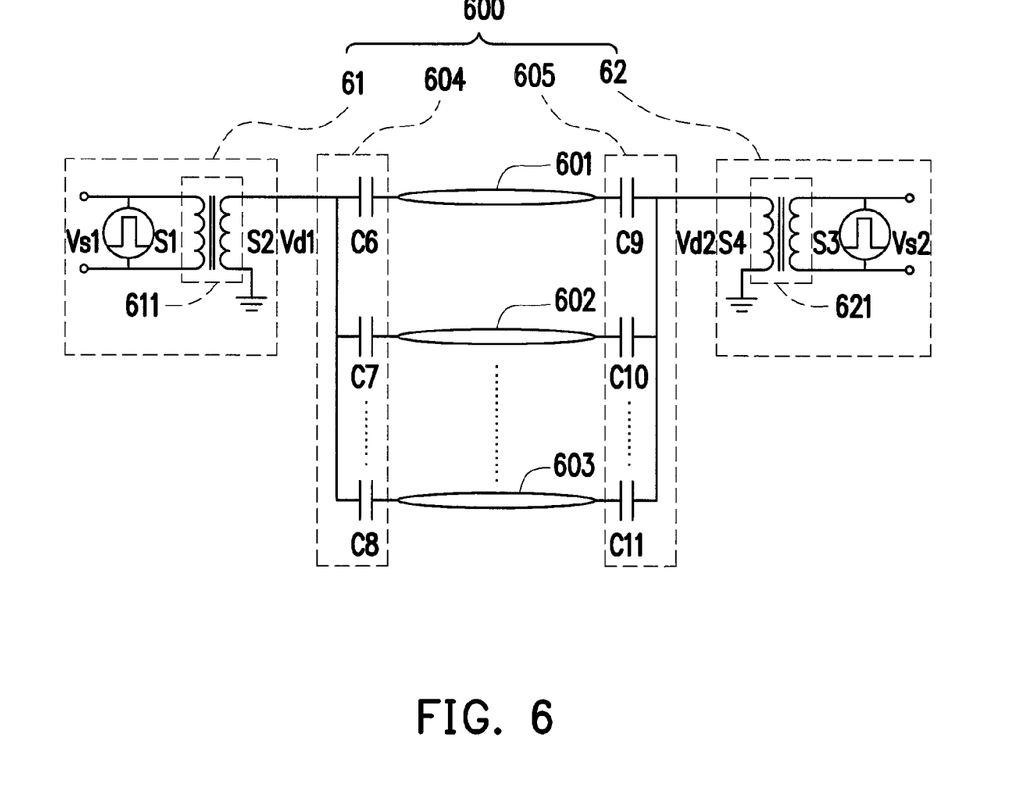
FIG. 6 is a circuit block diagram of a third embodiment of the light driver device in FIG. 3.

FIG. 6 is a circuit block diagram of a third embodiment of the light driver device 300 in FIG. 3. Referring to FIG. 6, the light driver device 600 includes a first inverter circuit board 61, a second inverter circuit board 62, a first balance circuit board 604, and a second balance circuit board 605. Compared with the single side drive mode in the above two embodiments, this embodiment adopts two sets of inverter circuit boards 61 and 62, which belongs to a double side drive mode.

A first transformer 611 of an inverter circuit on the first inverter circuit board 61 has a primary side S1 receiving a driving signal Vs1 and a secondary side S2 outputting a driving voltage Vd1. A second transformer 621 of an inverter circuit on the second inverter circuit board 62 has a primary side S3 receiving a driving signal Vs2 and a secondary side S4 outputting a driving voltage Vd2. The secondary sides S2, S4 are respectively coupled to the first balance circuit board 604 and the second balance circuit board 605, and lamps 601, 602, ..., 603 are coupled between the first balance circuit board 604 and the second balance circuit board 605. The balance circuits on the first balance circuit board 604 and the second balance circuit board 605 respectively include capacitors C6, C7, ..., C8 and C9, C10, ..., C11.

One ends of the capacitors C6, C7, ..., C8 of the first balance circuit board 604 are commonly coupled to the secondary side S2 of the first transformer 611, and the other ends of the capacitors C6, C7, ..., C8 are respectively coupled to one ends of the corresponding lamps 601, 602, ..., 603. One ends of the capacitors C9, C10, ..., C11 of the second balance circuit board 605 are commonly coupled to the secondary side S4 of the second transformer 621, and the other ends are respectively coupled to the other ends of the corresponding lamps 601, 602, ..., 603. The capacitors C6, C7, ..., C8 of the first balance circuit board 604 and the capacitors C9, C10, ..., C11 of the second balance circuit board 605 respectively receive and uniformly distribute driving voltages Vd1 and Vd2 provided by the first transformer 611 and the second transformer 621 to the lamps 601, 602, ..., 603, so as to drive the lamps to emit light.

Several embodiments of the light driver device are given above, which are not intended to limit the scope of the present invention. In some alternative embodiments, the balance circuit board may also be constituted by resistors or other elements, or even a variation of the coupling relationship between the elements in the above embodiments. Therefore, it falls within the protection scope of the present invention as long as the inverter circuit board and the balance circuit board are installed separately.

In the present invention, since the inverter circuit board and the balance circuit board are installed separately, the balance circuit board can be disposed in various manners. Several embodiments of a backlight device using the aforementioned light driver device are given below to illustrate the arrangements of the balance circuit board.

FIGS. 7A to 7G are side views of a backlight device according to an embodiment of the present invention. First referring to FIG. 7A, the backlight device of this embodiment includes a substrate 73, a lamp 71, a lamp holder 72, an inverter module 77, and a balance circuit board 76. The lamp holder 72 is disposed on one side of the substrate 73, for fixing the lamp 71. The lamp 71 may be disposed on one side of the substrate 73 and inside the lamp holder 72, or disposed outside the lamp holder 72, or even disposed on the other side of the substrate 73. The inverter module 77 provides at least one driving voltage for driving the lamp 71.

Figure 7A:
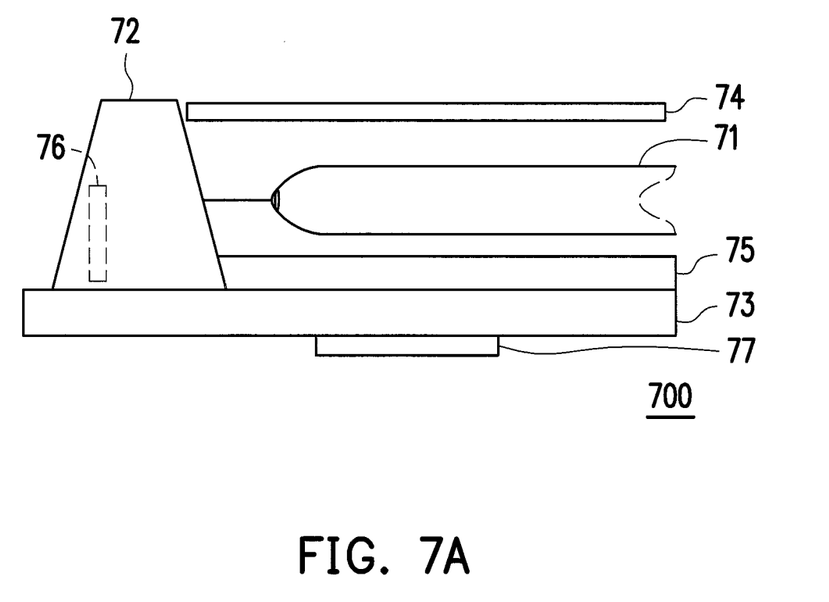
FIGS. 7A to 7G are side views of a backlight device according to an embodiment of the present invention.
Figure 7B:
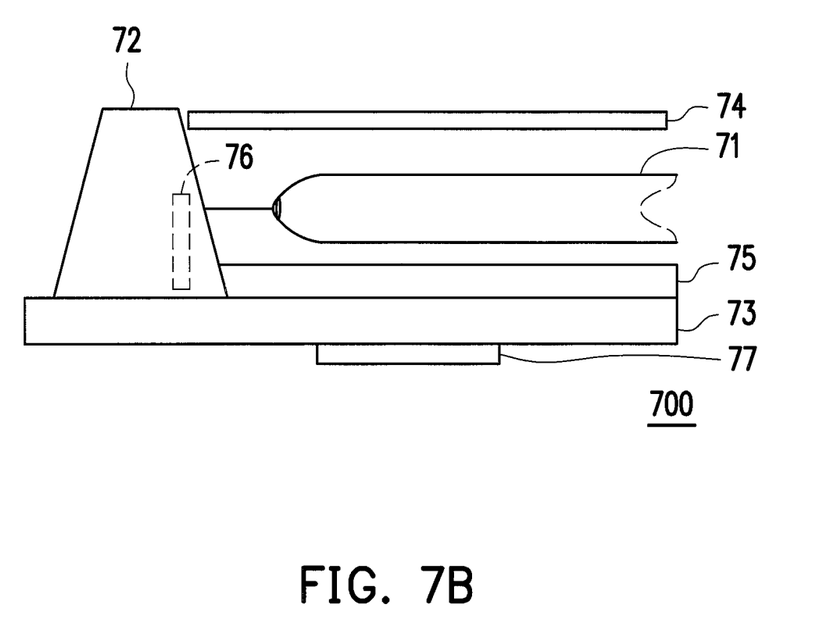
Figure 7C:
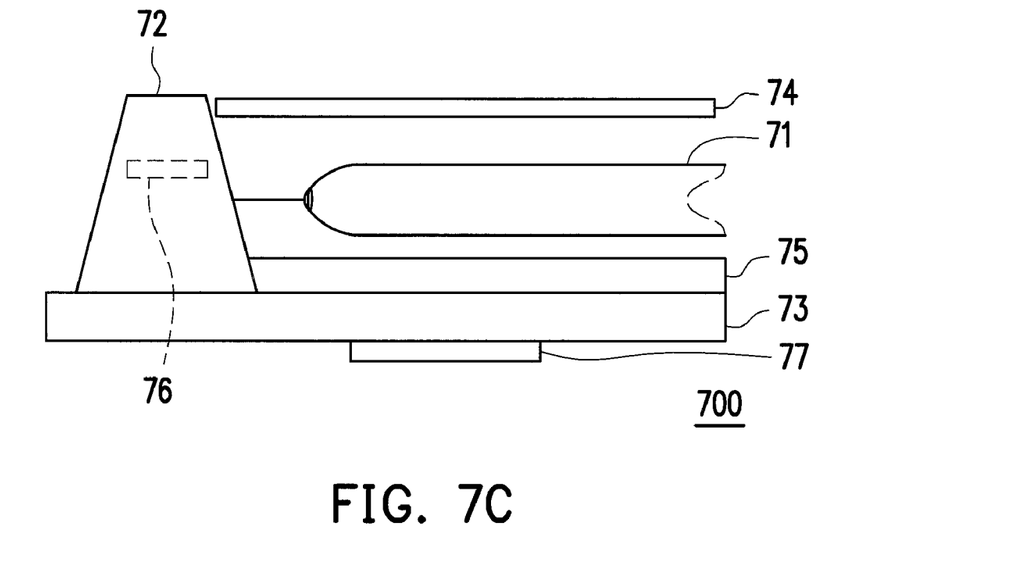
Figure 7D:
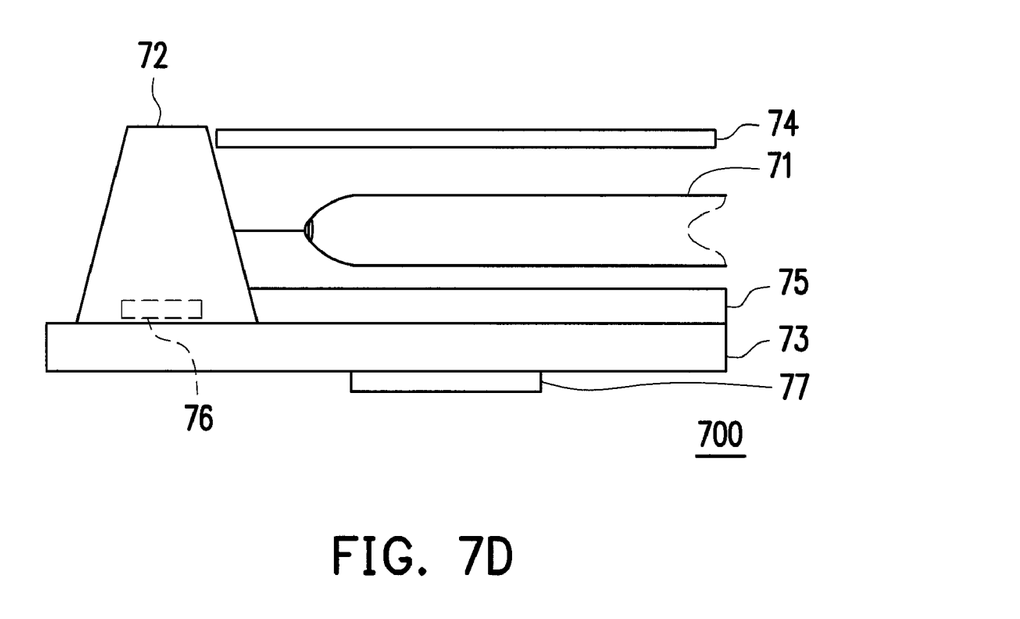

Similarly, referring to FIG. 7A, the backlight device of the present invention further includes a reflector 75 and a diffuser 74 in parallel to the reflector. The reflector 75 is disposed on the bottom of the lamp holder 72, for reflecting lights emitted by the lamp 71. The diffuser 74 is disposed on the top of the lamp holder 72, for diffusing lights emitted by the lamp 71 to form a surface light source.

The balance circuit board 76 is coupled to the lamp 71, and is joined with the lamp 71 through a connecter by means of welding or latching. As described above, as the balance circuit board 76 and the inverter circuit board are installed separately, there is no limitation where the balance circuit board can be disposed.

Referring to FIGS. 7A to 7D, the balance circuit board 76 may be disposed inside the lamp holder 72. For example, the balance circuit board 76 may be disposed on the left part of the lamp holder 72 in FIG. 7A, on the right part of the lamp holder 72 in FIG. 7B, on the upper part of the lamp holder 72 in FIG. 7C, or on the lower part of the lamp holder 72 in FIG. 7D.

Figure 7E:
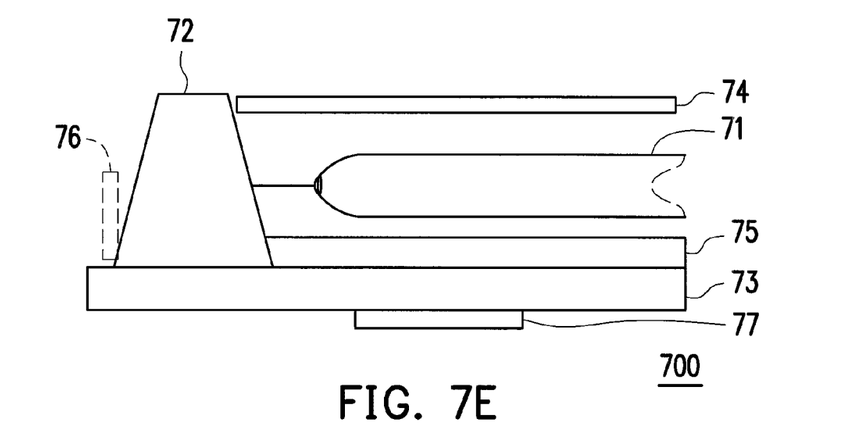
Figure 7F:
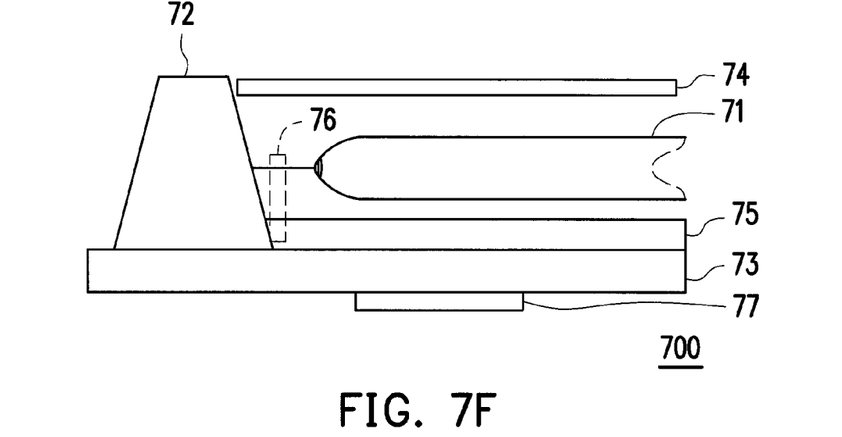
Figure 7G:
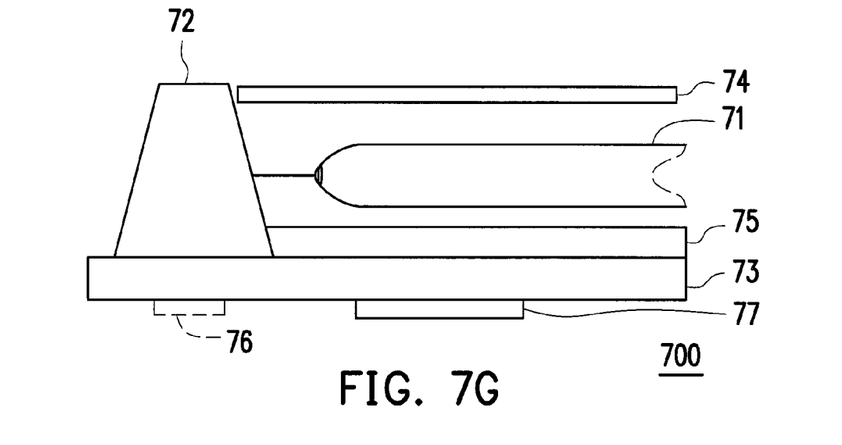

FIGS. 7E to 7G are side views of a backlight device according to another embodiment of the present invention. The structures of the backlight devices in these embodiments are similar to those in the above embodiments. The difference resides in that the balance circuit board 76 can be disposed outside the lamp holder 72. For example, the balance circuit board 76 may disposed at the left side of the lamp holder 72 in FIG. 7E, at the right side of the lamp holder 72 in FIG. 7F, or beneath the substrate 73 in FIG. 7G.

Though FIGS. 7A to 7G show embodiments of several arrangements of the balance circuit board 76, the present invention is not limited thereto. Persons of ordinary skill in the art should know that the balance circuit board 76 may be disposed according to actual requirements.

In view of the above, the light driver circuit device of the present invention is designed to install the inverter circuit and the balance circuit individually, so as to effectively reduce the space of the driving circuit and the total cost of the circuit design. Moreover, the balance circuit board is employed in the present invention, thus balancing the current in each CCFL effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light driver circuit device for synchronically driving a plurality of lamps, comprising:

a first inverter circuit board comprising a first inverter circuit coupled to a first driving signal for outputting a first driving voltage to drive the lamps synchronously; and a first balance circuit board comprising a first balance circuit which is coupled to one terminals of the lamps, wherein the first balance circuit board is disposed to separate from the first inverter circuit board, wherein the first inverter circuit comprises a first transformer having a primary side coupled to the first driving signal and a secondary side outputting the first driving voltage, wherein the first balance circuit is an inductor-capacitor (LC) network configured to uniformly distribute the first driving voltage to the lamps, wherein the first balance circuit is further coupled to the first inverter circuit, and the LC network comprises:

a plurality of inductors having one ends coupled to the secondary side of the first transformer and the other ends respectively coupled to high-voltage terminals of the lamps; and a plurality of capacitors, respectively coupled between the high-voltage terminals of adjacent lamps, wherein low-voltage terminals of the lamps are grounded.

2. The light driver circuit according to claim 1, wherein the first inverter circuit board is disposed perpendicularly to the first balance circuit board.

3. The light driver circuit according to claim 1, wherein the first balance circuit is further coupled to the first inverter circuit through the lamps, such that the high-voltage terminals of the lamps are changed to be coupled to the first driving voltage, the LC network is replaced by a resistor network, the low-voltage terminals of the lamps are grounded through the resistor network comprising a plurality of resistors having one ends respectively coupled to the low-voltage terminals of the lamps and the other ends grounded.

4. The light driver circuit according to claim 1, wherein the first balance circuit is further coupled to the first inverter circuit through the lamps, such that the high-voltage terminals of the lamps are changed to be coupled to the first driving voltage, the LC network is replaced by a switch network, the low-voltage terminals of the lamps are grounded through the switch network comprising a plurality of switches configured for determining whether or not to ground the low-voltage terminals of the lamps according to a switching signal.

5. The light driver circuit according to claim 4, wherein each of the switches comprises a transistor having a first source/drain end coupled to the low-voltage terminal of corresponding lamp, a second source/drain end grounded, and a gate end coupled to the switching signal.

6. The light driver circuit according to claim 1, wherein the LC network is replaced by a resistor network comprising a plurality of resistors having one ends coupled to the secondary side of the first transformer and the other ends respectively coupled to the high-voltage terminals of the lamps; and the low-voltage terminals of the lamps are maintained to be grounded.

7. The light driver circuit according to claim 1, wherein the LCD network is replaced by a capacitor network comprising a plurality of capacitors having one ends coupled to the secondary side of the first transformer and the other ends respectively coupled to the high-voltage terminals of the lamps; and the low-voltage terminals of the lamps are maintained to be grounded.

8. The light driver circuit according to claim 1, wherein the first balance circuit is coupled to the high-voltage terminals of the lamp, and the light driver circuit further comprises:
   a second inverter circuit board comprising a second inverter circuit coupled to a second driving signal for outputting a second driving voltage to drive the lamps synchronously; and
   a second balance circuit board comprising a second balance circuit which is coupled to the second inverter circuit, and the low-voltage terminals of the lamps are changed to be coupled to the second balance circuit,
   wherein the second balance circuit board is disposed to separate from the second inverter circuit board,
   wherein the LC network is replaced by a first capacitor network,
   wherein the second balance circuit is a second capacitor network configured to uniformly distribute the second driving voltage to the lamps.

9. The light driver circuit according to claim 8, wherein the second inverter circuit comprises a second transformer having a primary side coupled to the second driving signal and a secondary side outputting the second driving voltage.

10. The light driver circuit according to claim 9, wherein:
    the first capacitor network comprises a plurality of first capacitors having one ends coupled to the secondary side of the first transformer and the other ends respectively coupled to the high-voltage terminals of the lamps; and
    the second capacitor network comprises a plurality of second capacitors having one ends coupled to the secondary side of the second transformer and the other ends respectively coupled to the low-voltage terminals of the lamps.

11. The light driver circuit according to claim 1, wherein the lamps are cold cathode fluorescent lamps (CCFLs).

\* \* \* \* \*